United States Patent
Sander et al.

(10) Patent No.: US 7,243,566 B2
(45) Date of Patent: Jul. 17, 2007

(54) MANUAL GEARBOX FOR A MOTOR VEHICLE WITH A FRONT TRANSVERSE DRIVE

(75) Inventors: Edmund Sander, Leonberg (DE); Marc Kluge, Besigheim (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 174 days.

(21) Appl. No.: 10/517,823

(22) PCT Filed: May 17, 2004

(86) PCT No.: PCT/EP2004/005265

§ 371 (c)(1), (2), (4) Date: Dec. 14, 2004

(87) PCT Pub. No.: WO2004/111501

PCT Pub. Date: Dec. 23, 2004

(65) Prior Publication Data

US 2006/0058147 A1    Mar. 16, 2006

(30) Foreign Application Priority Data

Jun. 14, 2003   (DE) ................................. 103 26 865

(51) Int. Cl.
*F16H 57/02*    (2006.01)
(52) U.S. Cl. ...................................................... 74/331
(58) Field of Classification Search ................ 475/200, 475/203, 206; 74/606 R, 329, 331
See application file for complete search history.

(56) References Cited

U.S. PATENT DOCUMENTS 4,682,516 A * 7/1987 Okubo ........................ 475/206
4,799,399 A * 1/1989 Bruce ....................... 74/473.21

FOREIGN PATENT DOCUMENTS

| DE | 44 43 523 C1 | 5/1996 |
| EP | 1 065 416 A2 | 1/2001 |
| EP | 1 067 312 A1 | 1/2001 |

* cited by examiner

Primary Examiner—Richard M. Lorence
Assistant Examiner—Edwin A. Young
(74) Attorney, Agent, or Firm—Crowell & Moring LLP

(57) ABSTRACT

A manual transmission for a motor vehicle with a front transverse drive, has a wheel set which consists of a transmission input shaft and at least two transmission output shafts, both engaged via a gearwheel with the spur wheel of an axle differential. A-rotationally fixed connection of the loose wheels and/or gearshift wheels provided on the two transmission output shafts with the coupling units assigned to them is provided by gearshift forks displaceably arranged on the shift axles and selectable and operable via at least one gearshift lever shaft. For bearing and/or accommodation of the gearshift axles and the gearshift lever shaft, a common bearing unit is provided. The bearing unit is arranged between the wheel set (transmission input shaft, transmission output shaft) and the central opening in the axial differential.

5 Claims, 5 Drawing Sheets

MANUAL GEARBOX FOR A MOTOR VEHICLE WITH A FRONT TRANSVERSE DRIVE

This application claims the priority of PCT/EP04/05265 filed May 17, 2004 which claims priority to German Patent Application No. 10326865.0 filed Jun. 14, 2003.

BACKGROUND OF THE INVENTION

The present invention relates to a manual transmission for a motor vehicle with a front transverse drive.

In for example, EP 1 067 312 B1 or EP 0 046 373 A1, manual transmission designs are shown having two idler shafts with ratchet wheel pairings that are shiftable accordingly. Each of the two transmission output shafts of a so-called three-shaft transmission is engaged with the gearwheel of an axle differential via a spur gearing. Such transmission designs are used with vehicles with a front transverse drive because they are short and compact due to the use of three transmission shafts. The shift gearwheels provided on both transmission output shafts are shifted as needed via locking synchronizers in a rotationally fixed connection to the transmission output shafts. This requires gearshift forks that act on the gearshift sleeves of the synchronizing units and are mounted on corresponding shift axles. In the case of a non-automatic manual transmission, gearshift lever shafts are necessary for selecting and operating the gearshift forks.

SUMMARY OF THE INVENTION

An object of the present invention is to provide a space-saving and compact bearing for the shift axles and the gearshift lever shaft for a generic manual transmission.

This object has been achieved in a manual transmission in which a common bearing unit for at least one of bearing and accommodation of the gearshift axles and the gearshift lever shaft, wherein the bearing unit is arranged between the wheel set and a central opening in the axle differential.

Due to the arrangement of a common bearing unit which is provided for the bearing and/or accommodation of the shift axles and the gearshift lever shaft between the wheel set and the central receptacle opening in the differential spur gear, the total design space can be further reduced in comparison with known transmission designs.

The bearing unit configured as a bearing bridge has a total of three bearing eyes which serve to accommodate the two shift axles and the gearshift lever shaft. The bearing bridge is arranged in a space-saving manner between the wheel set and the differential spur wheel so that it at least partially bridges the latter. To minimize the design size, the bearing bridge is configured as a profile element which is provided with two offset fastening straps at its two ends.

BRIEF DESCRIPTION OF THE DRAWINGS

Other objects, advantages and novel features of the present invention will become apparent from the following detailed description of the invention when considered in conjunction with the accompanying drawings.

BRIEF DESCRIPTION OF THE DRAWINGS

Figure 1:
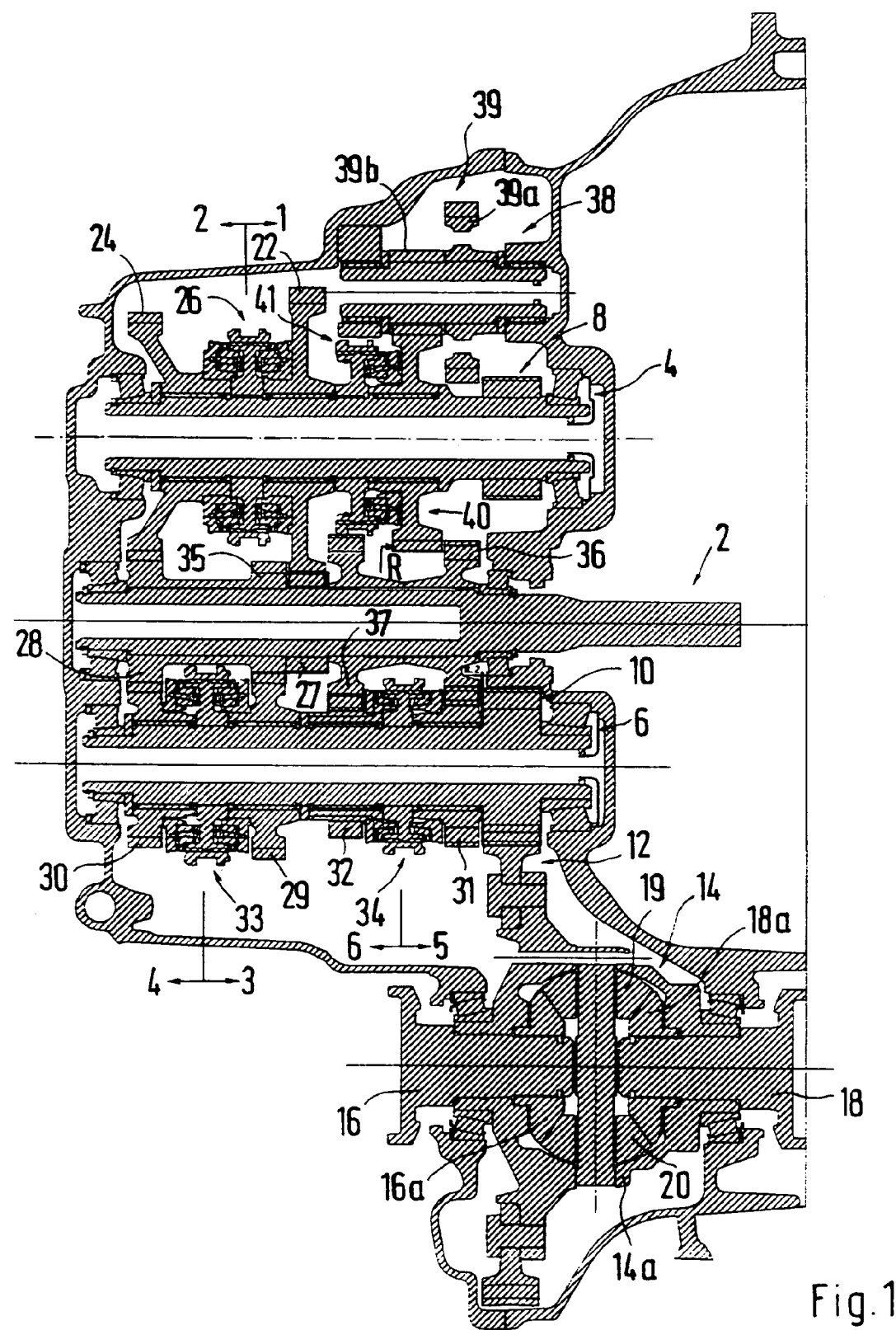
Figure 2:
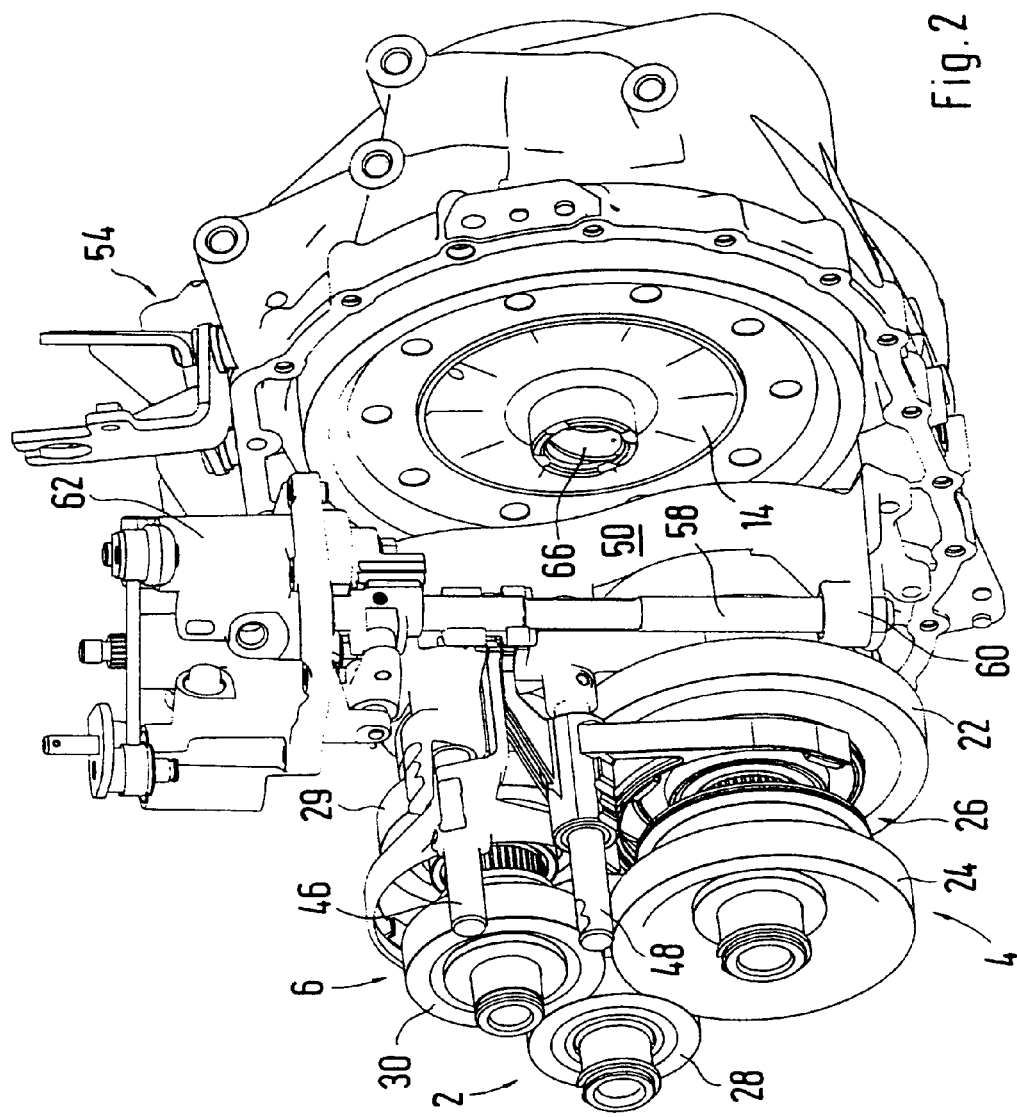
Figure 3:
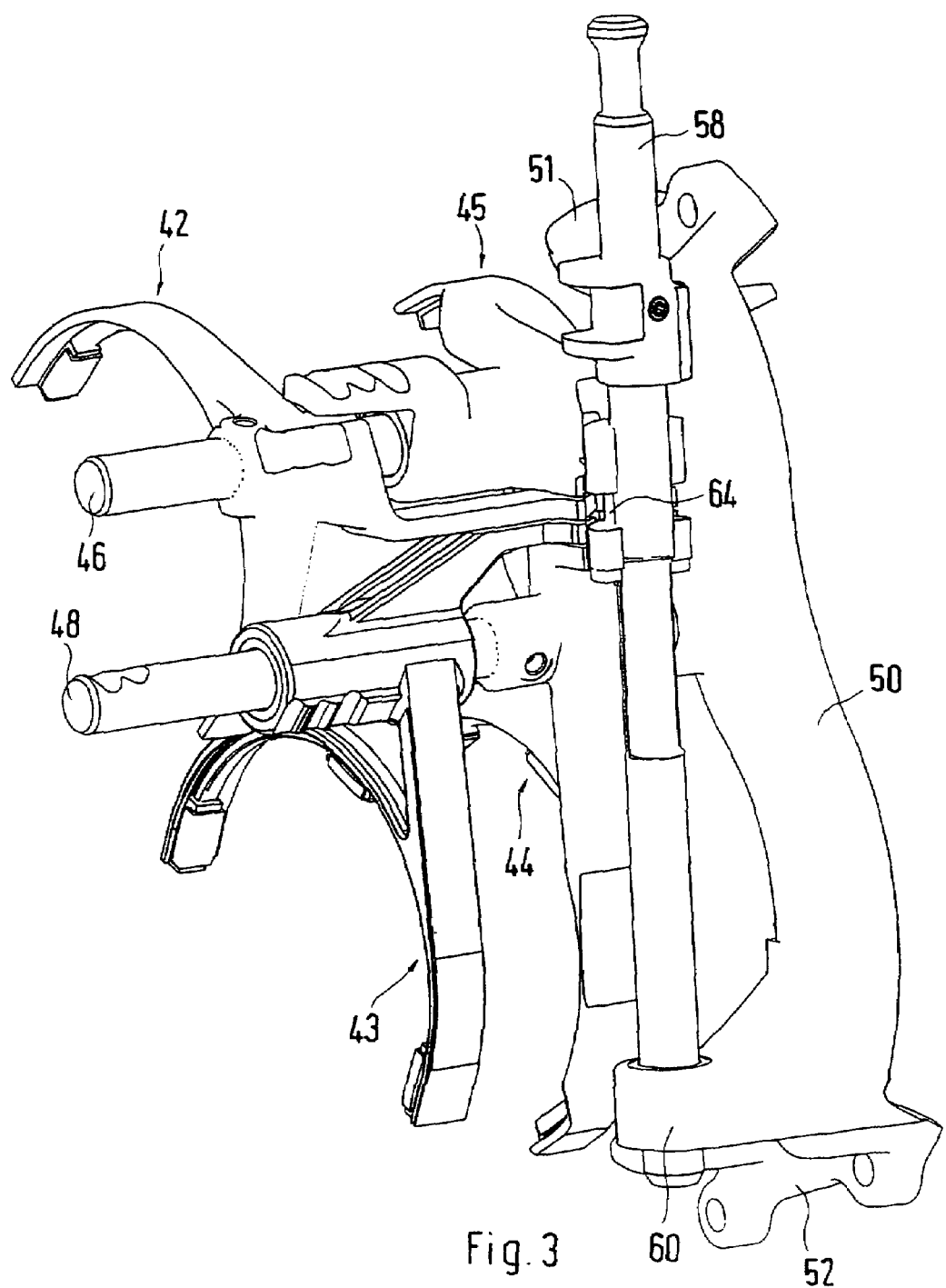
Figure 4:
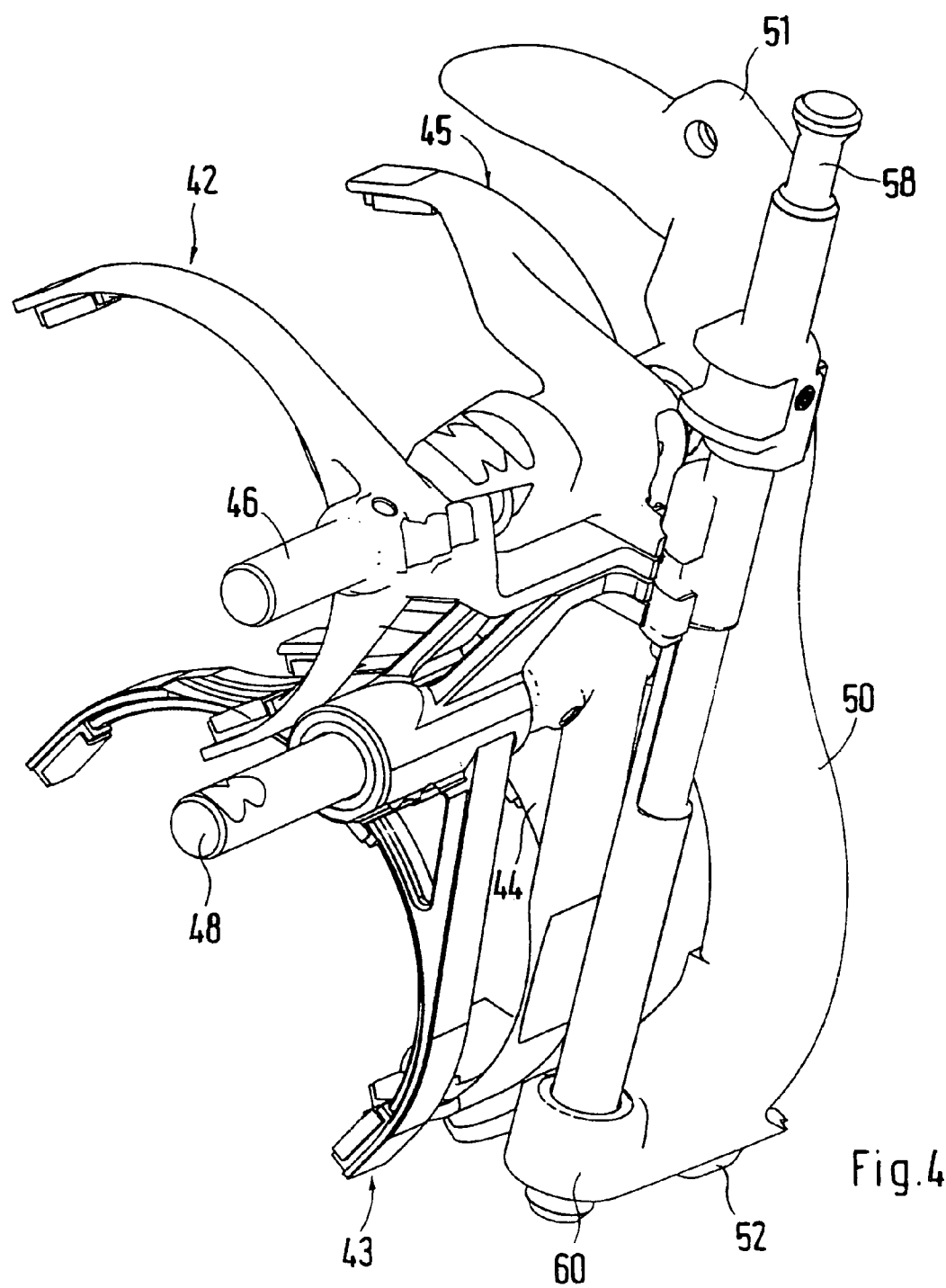

FIG. 1 is a cross-sectional view showing the wheel set arrangement of a three-shaft transmission;

FIG. 2 is a perspective view of the transmission of FIG. 1 with the wheel set and the shift arrangement;

FIG. 3 is a perspective view of the gearshift;

FIG. 4 is another perspective view of the gearshift shown in FIG. 3; and

Figure 5:
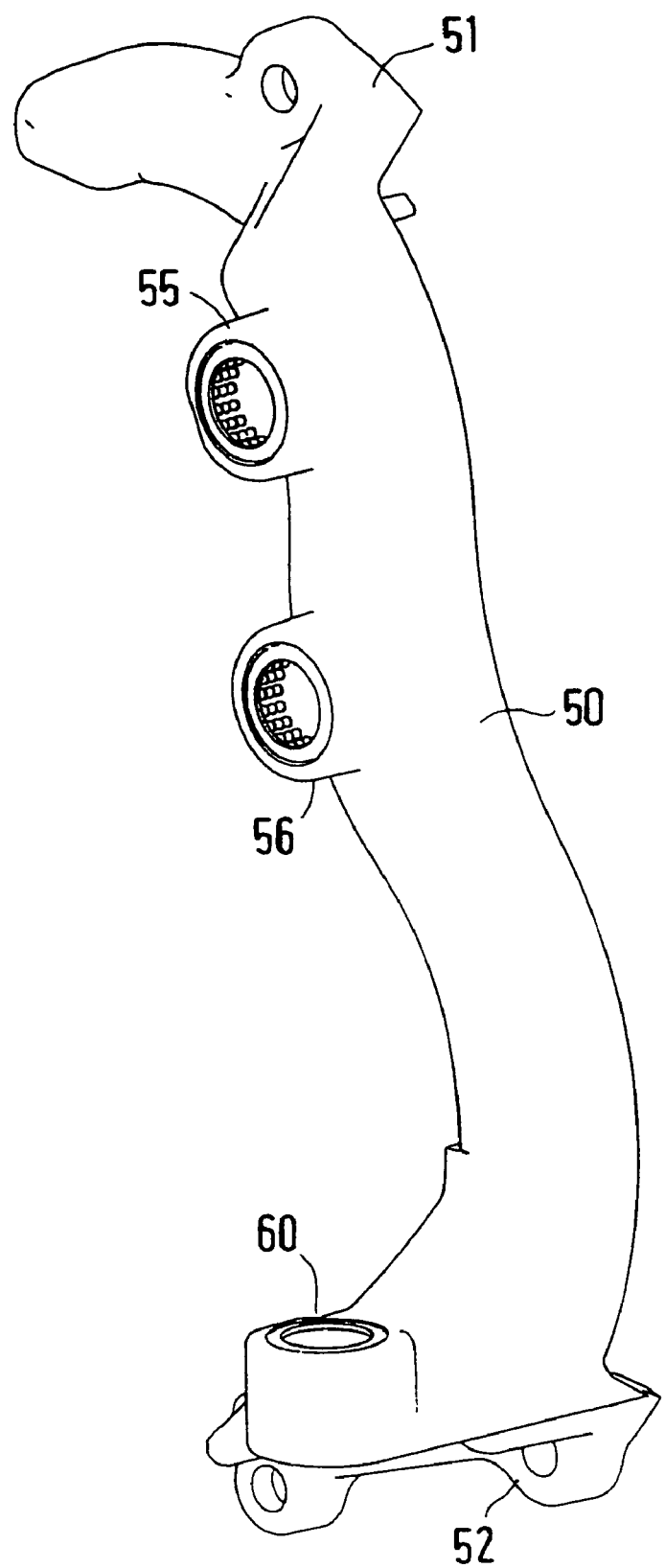

FIG. 5 is a perspective view of a bearing unit for the shift axles in the main gearshift lever shaft.

DETAILED DESCRIPTION OF THE DRAWINGS

FIG. 1 shows the wheel set arrangement of a three-shaft transmission in an "exploded" diagram which does not show the exact spatial relationship, in which two transmission output shafts 4, 6 are provided in addition to a transmission input shaft 2, with both of the output shafts 4, 6 being connected to a spur wheel 12 of an axle differential 14 via a respective gearwheel 8,10. The axle bevel gears 16a, 18a which drive the two respective axles shafts 16, 18 as well as the two differential bevel pinions 19, 20, which are in engagement with the axle bevel gears 16a, 18a, are arranged in the differential housing 14a in a generally known manner.

The loose wheels 22, 24 for the respective gears 1, 2 which are arranged on the first transmission output shaft 4 can be connected in a rotationally fixed manner to the transmission output shaft 4 with the help of a first locking synchronizer 26. The two loose wheels 22, 24 each engage with one of the ratchet wheels 27, 28 arranged on the transmission input shaft 2. The loose wheels 29 through 32 are arranged on the second transmission output shaft 6. The loose wheels 29, 30 cooperate with a second locking synchronizer 33 for switching the third and fourth gears, and the loose wheels 31, 32 cooperate with a third locking synchronizer 34 for shifting the gears 5, 6.

All four loose wheels mounted on the transmission output shaft 6 engage with ratchet wheels mounted on the transmission input shaft 2, namely, the loose wheel 29 with the ratchet wheel 35; the loose wheel 30 with the ratchet wheel 28; the loose wheel 31 with the ratchet wheel 36; and the loose wheel 32 with the ratchet wheel 37. For moving into a reverse gear, a fourth transmission axle 38 is provided for reversing the direction of rotation, with a gearwheel 39 having two gearwheel rings 39a, 39b rotationally mounted on it side by side. The loose wheel 40 for the reverse gear arranged on the transmission output shaft 4 is engaged with the second gearwheel ring 39b of the gearwheel 39, and the ratchet wheel 36 which is arranged on the transmission input shaft 2 is engaged with the first gearwheel ring 39a of the gearwheel 39. The loose wheel 40 is, in turn, connected in a rotationally fixed manner to the transmission output shaft 4 via a fourth locking synchronizer 41 in case of need.

For axial displacement of the locking synchronizers 26, 33, 34 and 41 arranged on the two transmission output shafts 4, 6 as illustrated in FIG. 3, for example, four gearshift forks 42 through 45 are provided, engaging in a known manner in gearshift sleeves of the locking synchronizers. The two shift axles 46, 48 are provided for the bearing of the gearshift forks 42 through 45, with gearshift forks 42, 45 and/or the gearshift forks 43, 44 being displaceably mounted on the axles. For the bearing of the two shift axles 46, 48, a bearing unit 50 which is configured as a bearing bridge is provided. The unit 50 is mounted on the transmission housing 54 with the aid of two mounting straps 51, 52 which are configured with an offset (see also FIG. 4).

On the upper end of the bearing bridge 50, two bearing eyes 55, 56 (see FIG. 5) are provided for accommodating the two gearshift axles 46, 48. For selecting and operating the gearshift forks 42 through 45, a single main gearshift lever shaft 58 is provided, with the shaft 58 also being mounted on and/or in the bearing bridge 50 at its one end. To do so, a third bearing eye 60 is provided on the lower end of the bearing bridge 50, aligned essentially perpendicular to the two first bearing eyes 55, 56. At its upper end, the main gearshift lever shaft 58 is mounted in a housing cover 62 (see FIG. 2) which is, in turn, mounted on a transmission housing cover (not shown) which is flange-connected to the transmission housing 54. The selector and gearshift mechanism (not shown) for a translational and rotational movement of the main gearshift lever shaft 58 is integrated into the housing cover 62.

For selecting and operating the individual gearshift forks 42 through 45, a gearshift finger 64 is provided on the main gearshift lever shaft 58, engaging in a shift opening in the corresponding gearshift fork according to the preselected axial position of the main gearshift lever shaft 58. A rotational movement of the main gearshift lever shaft 58 to the right or left causes an axial displacement of the selected gearshift fork by which a locking synchronizer assigned to the particular loose wheel is activated. As shown in FIG. 2, the bearing bridge 50 is arranged in a space-saving manner between the wheel set (the transmission input shaft 2, the transmission output shaft 4, 6) and the central opening 66 in the axle differential 14 through which the axle shaft 16 passes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A manual transmission for a motor vehicle with a front transverse drive, comprising a transmission housing a wheel set having a transmission input shaft and at least two transmission output shafts engaged via a gearwheel with a spur wheel of an axle differential, a rotationally fixed connection of at least one loose wheel and gearshift wheel provided on the at least two transmission output shafts with coupling units assigned thereto effected by gearshift forks arranged displaceably on gearshift axles, and selectable and operable via at least one gearshift lever shaft, and a common bearing unit configured as a one-piece bearing bridge for at least one of bearing and accommodation of the gearshift axles and the at least one gearshift lever shaft, wherein the bearing bridge is separate from and associated with the transmission housing, and is arranged between the wheel set and a central opening in the axle differential.

2. A manual transmission as claimed in claim 1, wherein the bearing bridge has two bearing eyes for the gearshift axles and a third bearing eye for accommodating the gearshift lever shaft, said third bearing eye being aligned perpendicular to the two bearing eyes.

3. A manual transmission as claimed in claim 2, wherein the bearing bridge at least partially covers a differential spur wheel of the axle differential.

4. A manual transmission as claimed in claim 2, wherein the bearing bridge is a profile element having two fastening straps with an offset on two ends thereof.

5. A manual transmission as claimed in claim 4, wherein the bearing bridge at least partially covers a differential spur wheel of the axle differential.

\* \* \* \* \*